April 5, 1960   C. W. RUDDELL   2,931,579
AUTOMATIC IRRIGATION SYSTEM
Filed Dec. 27, 1957   2 Sheets-Sheet 1
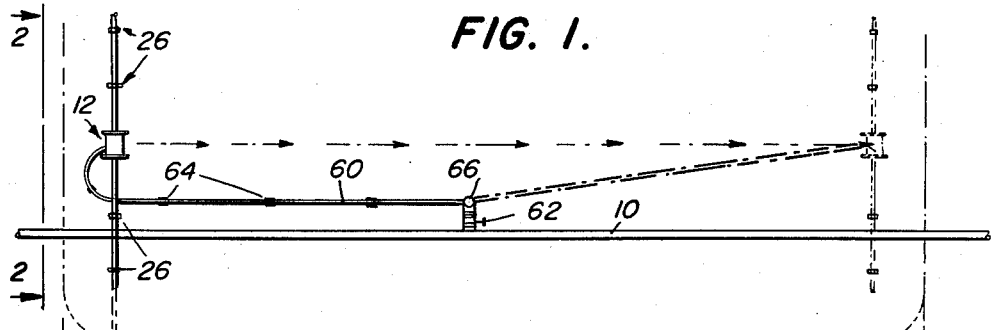
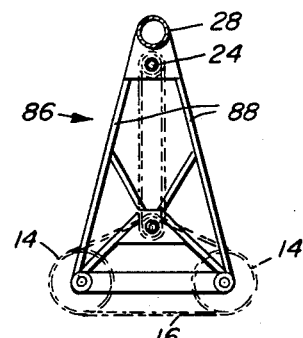
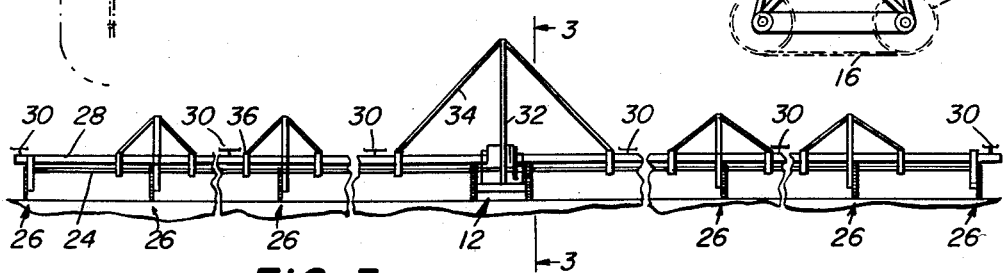
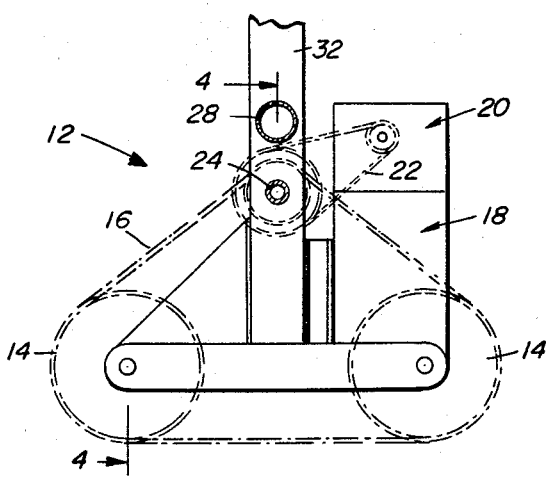
INVENTOR
CLARENCE W. RUDDELL
BY
ATTORNEY

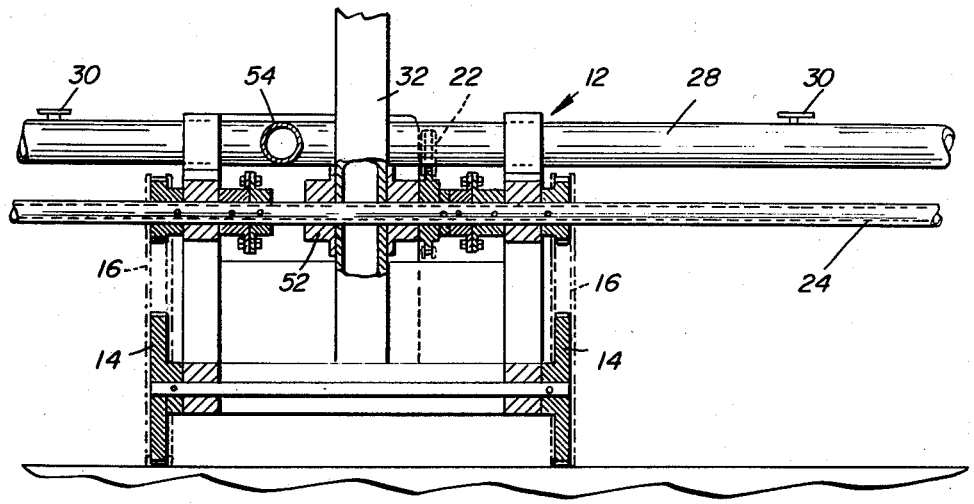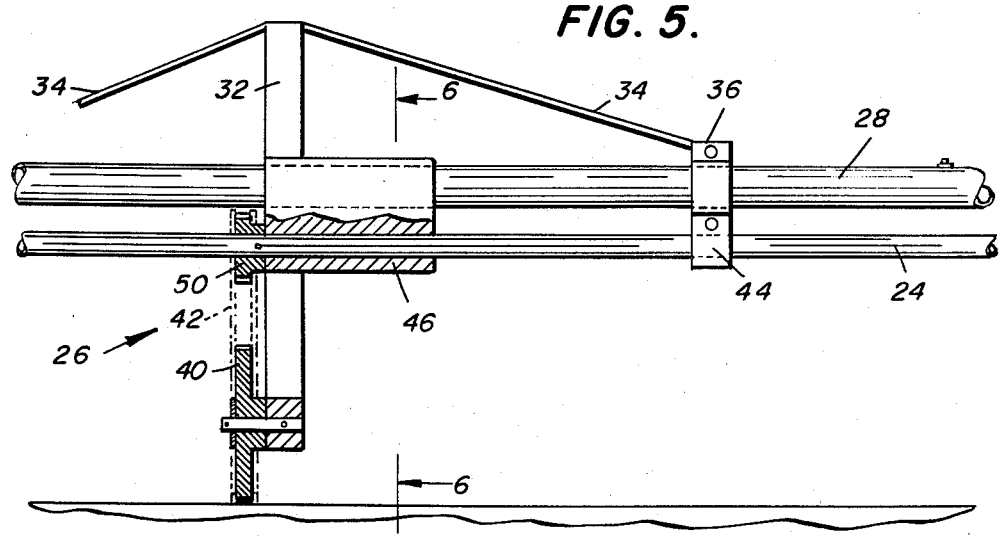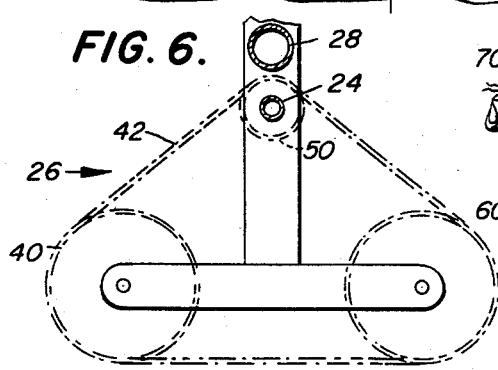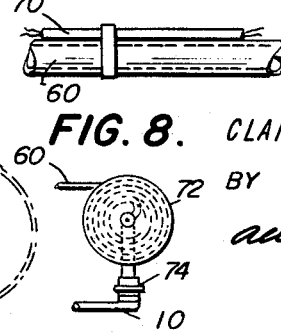
INVENTOR
CLARENCE W. RUDDELL
ATTORNEY

United States Patent Office 2,931,579
Patented Apr. 5, 1960

2,931,579

AUTOMATIC IRRIGATION SYSTEM

Clarence W. Ruddell, Pacoima, Calif.

Application December 27, 1957, Serial No. 705,611

5 Claims. (Cl. 239—179)

This invention relates to an improved automatic irrigation system and has for one of its principal objects the provision of an apparatus of the class described, wherein a considerable area of ground can be supplied with water or sprinkled in a relatively simple and highly efficient manner, and without the necessity of a great deal of hand labor.

One of the important objects of this invention is to provide an automatically operative irrigation equipment which includes a plurality of sprinklers on wheeled carriages driven by central source of power and in a single unit, whereby a single water supply line is incorporated into the unit and for easy and ready connection to a source of supply.

Another important object of this invention is the provision of an automatic sprinkling system or irrigating machine which will, while it is in operation, travel over the area to be sprinkled or irrigated and in such a manner that an efficient coverage of the ground is insured after which the same operation can be repeated over an adjacent area with little or no difficulty.

Another and still further important object of this invention resides in an apparatus which is practically self-propelled over the area at a controlled rate of speed, the propulsion mechanism being selectively an internal combustion engine, an electric motor or even the power of the flowing water itself.

Yet another important object of the invention pertains to a construction which is siutably strong for the purpose but which at the same time is sufficiently flexible to conform to the surface of the ground over which it travels and which also will remain in proper and desired alignment regardless of minor difficulties or obstacles.

Other and further important objects of the invention will be apparent from the disclosures in the accompanying drawings and following specification.

The invention, in a preferred form, is illustrated in the drawings and hereinafter more fully described.

In the drawings:

Figure 1 is a plan view, partly diagrammatic and with certain parts omitted showing the improved automatic irrigating system of this invention and illustrating one phase of its operation.

Figure 2 is a view taken on the plane of the line 2—2 of Figure 1 comprising an enlarged showing of the apparatus and with parts broken away.

Figure 3 is an enlarged view, partly in section on the line 3—3 of Figure 2, looking in the direction indicated by the arrows.

Figure 4 is also an enlarged sectional view taken on a broken line 4—4 of Figure 3, looking in the direction indicated.

Figure 5 is a detail of a portion of the extension of the irrigating apparatus and comprises a substantial enlargement of a portion of the similar showing depicted in Figure 2.

Figure 6 is a view, partly in section on the line 6—6 of Figure 5, showing the secondary carriage of Figure 5.

Figure 7 illustrates one method of carrying electric current to the main mobile driving unit of the apparatus of this invention.

Figure 8 is a detail view illustrating a modification.

Figure 9 is a view similar to Figure 6, but showing a further modification.

As shown in the drawings:

The reference numeral 10 indicates generally a main water supply line to which the automatic irrigation apparatus of this invention is connected for operating purposes.

As is well known in the industry, these main supply lines are provided for fields for growing crops and particularly where the area under cultivation is of a considerable extent. The supply lines are spaced at intervals, depending upon the local conditions. The apparatus of this invention will also operate in connection with irrigation ditches.

A central carriage 12 is provided comprising a frame work as best shown in Figure 3 and with tractor or similar wheels 14 equipped with a ladder or similar chain 16, whereby the apparatus can be readily moved over the ground to be sprinkled or irrigated.

The motive power is provided by means of an engine or motor indicated generally by the reference numeral 18 in Figure 3 and this is usually equipped with a speed reducer unit 20 which by means of a further chain 22 rotates a torque tube or drive shaft 24. This torque shaft is of considerable length as best shown in Figure 2 and is connected at intervals with secondary carriages 26, as best shown in Figure 6. The carriages are variable in number, depending upon conditions of terrain and also the area to be covered during the sprinkling operation.

The torque tube drive, with its connected and related carriages, supports a laterally extending water supply line 28 which in practically all of the equipment of this type is of considerable diameter, and therefore able to carry a great number of gallons of water per minute.

Sprinkler heads 30 are fitted onto the supply line 28 at regular intervals and suitable supporting masts 32 with tie-rods 34 connected to the water line by clamps 36 are provided, all as best shown in Figure 5.

Each of the carriages 26 is provided with ground contacting wheels 40 and a ladder chain 42 similar to the equipment shown in Figure 3.

The torque tube or drive shaft 24 is mounted in suitable bearings 44 which usually comprise part of the clamps 36 and extra bearings 46 mounted on each of the secondary carriages. The wheels and chains 40 and 42 are driven by means of sprockets 50 connected to the torque tube or drive shaft adjacent the bearings 46 on the carriages 26.

Similar bearings 52 are provided for the torque tube on the main drive unit 12, as best shown in Figure 4; and a hose connection 54 is on the lateral supply line 28, this forming part of the main unit carriage 12.

In operation a length of flexible hose 60 is connected by a quick change coupler to a shutoff valve 62 on the main supply line 10 and unit of this invention is then moved out to one end of the field or other area to be irrigated, all as best shown in Figure 1.

Motive power is then applied by way of the engine or other unit 18, whereupon the entire apparatus including the torque drive, the lateral water line, the auxiliary carriages 26 and other appurtenances is slowly moved in the direction shown by the arrows in Figure 1, dragging the hose 60 with it. The hose can, if necessary, be supported on dollies 64 spaced at intervals along its length whereby easy transportation over relatively uneven ground is assured. The operation continues until the entire unit has traveled twice the length of the hose as shown by the dot and dash lines in Figure 1, this being made possible by means of a swivel connection 66 at the shutoff valve on the main water line. The operation is then repeated either in the same direction or the unit is moved to one side or the other for connection to either additional valves or other supply lines.

In the event that the motive power includes an electric motor, a current supply wire 70 can be mounted on the hose 60 as best shown in Figure 7; and if desired, the hose 60 can be wound upon a retrieving type reel 72 as shown in Figure 8. A swivel 74 for freely supporting the reel can in that case be fixed onto the supply line 10.

Alternatively, the power of the water flowing through the hose from the main supply line can be utilized to move the equipment instead of a gas engine or an electric motor.

In many cases water can be pumped directly from an irrigation ditch to the traveling unit of this invention by means of some suitable source of power and thereby sprinkled onto adjacent territory, or in this case one end of the inlet hose simply trails in the ditch and may be covered with a screen to prevent the entry of undesirable foreign matter into the pump or sprinklers.

In Figure 9 a secondary carrier 86 for higher crops is provided, having supports 88 which raise the water line above the crops to prevent damage of the same while being sprinkled.

It will be seen that herein is provided an automatic irrigation system which is novel, useful and original in that it will travel in a straight path, thereby requiring far less servicing and individual personal attention than any other devices or methods now in use. So long as the torque tube or drive shaft is turning, the system travels straight ahead and will be continuously sprinkling. The dollies which support the hose are provided with wheels which swivel freely in all directions thereby rendering easy resultant movement of the hose even while full of water.

The unit 12 can also be made to include a fertilizer and the speed can be as low as five feet per hour. The carriages of the main unit and the secondary units will be operating as tractors laying their own paths and road surfaces. The driving effect of the torque tube on the wheels of the master carriage and on all the secondary carriages will assure that the entire apparatus will always travel in a straight line and any existing hand operated lateral line with a positive locking coupler can readily be adapted to this system.

I am aware that many changes may be made and numerous details of construction varied throughout a wide range without departing from the principles of this invention, and I, therefore, do not propose limiting the patent granted hereon otherwise than as necessitated by the prior art.

I claim as my invention:

1. An automatic irrigation unit comprising a central power driven tractor, a drive shaft supported in bearings in the tractor, secondary carriages on the drive shaft and spaced away from the tractor and each other, a laterally extending main water supply line supported on the tractor and carriages, a flexible hose connecting the supply line to a source of water, sprinklers on the supply line, a source of power for the tractor connected to the structure, masts and lateral supports for the water line on the carriages and the tractor, the supports for the water line including bearings for the drive shaft and ground contacting road laying chains for the tractor and carriages.

2. A device as described in claim 1, wherein the power unit comprises an electric motor, and wherein current carrying wires for the motor are connected to the flexible hose.

3. A device as described in claim 1, wherein the source of power is operated by the water flowing under pressure to the supply line.

4. A device as described in claim 1, wherein the hose is mounted on a retrieving type reel and is supported by dollies connected thereto at intervals, said dollies provided with swiveled wheels.

5. A device as described in claim 1, wherein the hose is supported by dollies connected thereto at intervals, said dollies provided with swiveled wheels.

References Cited in the file of this patent

UNITED STATES PATENTS

| 959,914 | Bevill | May 31, 1910 |
| 1,322,604 | Nuhring | Nov. 25, 1919 |
| 2,226,192 | Barrett | Dec. 24, 1940 |
| 2,744,785 | Lundegreen | May 8, 1956 |
| 2,801,132 | Shuck | July 30, 1957 |

FOREIGN PATENTS

| 356,073 | Germany | July 12, 1922 |